United States Patent Office 3,392,650
Patented July 16, 1968

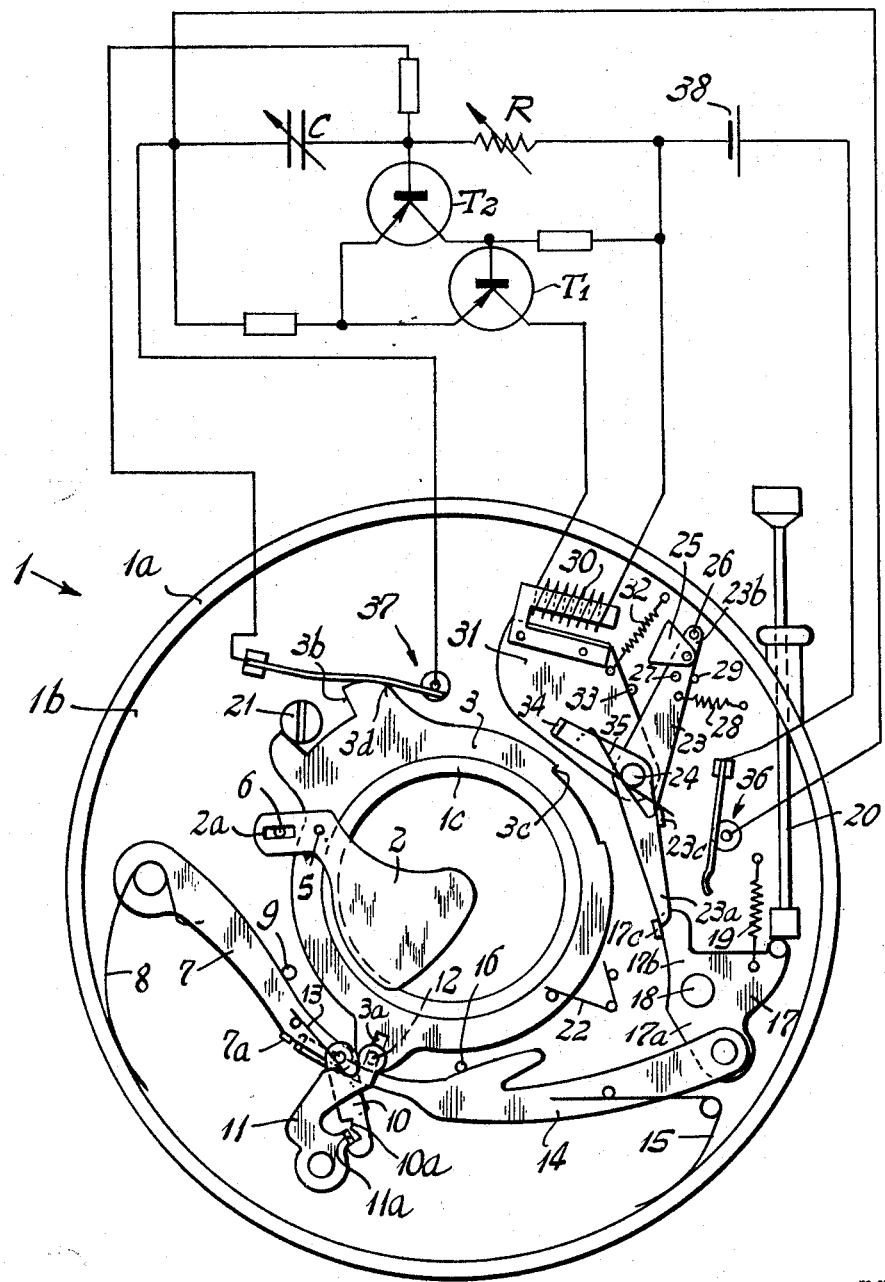

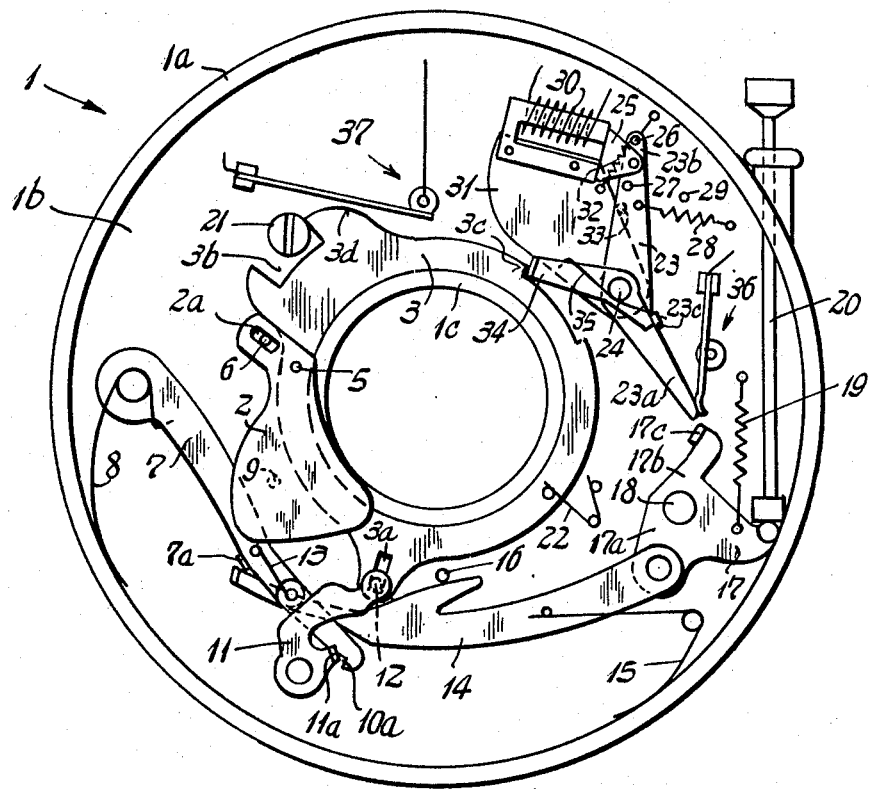

3,392,650
PHOTOGRAPHIC SELF-COCKING SHUTTER WITH RECIPROCABLE SHUTTER BLADES AND DRIVING DEVICE
Fritz Carl Richter, Calmbach, Black Forest, Germany, assignor to Prontor-Werke Alfred Gauthier, G.m.b.H., Calmbach, Black Forest, Germany, a corporation of Germany
Filed Nov. 26, 1965, Ser. No. 509,866
Claims priority, application Germany, Dec. 4, 1964, G 42,180
8 Claims. (Cl. 95—63)

ABSTRACT OF THE DISCLOSURE

A photographic self-cocking shutter that has shutter blades that are reciprocable by a driving device. A driving member cooperates with an escapement device for obtaining different exposure times in the open position. A two-armed actuating lever is provided which has a restoring spring acting thereon. The actuating lever participates in the motion of a cocking and release member during the cocking process of the shutter. An electromagnet cooperates with an armature carried at one end of the actuating lever. An electronic timing circuit controls the electromagnet and an arresting lever is associated with the actuating lever. The arresting lever is movable with the actuating lever so that it comes into engagement with the driving member of the shutter blades when the shutter blades are in the open position. The arresting lever is guided out of its locking position by the actuating lever when the actuating lever returns to its initial position.

---

The present invention relates to a photographic self-cocking shutter having shutter blades which can be reciprocated by a driving device, and whose driving member is affected in the open position, by an escapement device for obtaining different exposure times.

Heretofore, shutters of this type were provided with a mechanical escapement device for obtaining different exposure times.

It is the object of this invention, therefore, to provide a self-cocking shutter of the preceding species with an electronic timing circuit, and to connect this circuit to the mechanism serving as the shutter blade drive, through comparatively simple means, and in such a manner that an unobstructed functional execution of the shutter is assured.

To accomplish this object, the present invention provides a two-armed actuating lever which is acted upon by a restoring spring and participates, during the cocking process of the shutter, in the motion of the cocking and release member. The lever carries, at one end, an armature which cooperates with an electromagnet controlled by an electronic timing circuit. Associated with the actuating lever, is an arresting lever which is movable with the actuating lever and which engages the driving member of the shutter blades when the latter are in open position. The arresting lever is moved in a guided manner, out of the locking position by the actuating lever upon the latter's return to its initial position. This method makes it possible to obtain with comparatively simple means, a functional sequence in which the individual elements are dependent upon one another in a positive manner and become operative during the executing motion of the shutter. Assurance is obtained thereby, of an unobstructed functional operation of the self-cocking shutter equipped with a mechanical shutter blade drive, and with an electronic timing circuit.

Another object of this invention is to provide an arresting lever adapted to be particularly advantageous for the functional operation of the self-cocking shutter, in that the arresting lever is coaxially mounted with the actuating lever, and coupled to it.

It is a further object of this invention to provide that the cocking and release member adapted to actuate the shutter, include an additional driving arm which acts on the actuating lever and which is automatically moved out of engagement during the cocking process of the shutter after the armature engages the electromagnet. This provision serves the purpose of bringing about simple operation of the self-cocking shutter, since the actuating lever carrying out different functions, is positively guided at the same time that the driving device is cocked.

In order to prevent the occurrence of a longer release period due, perhaps, to the premature engagement of the armature with the electromagnet, the invention provides that the electromagnet be fixed on a supporting plate which is pivoted co-axially with the actuating lever, and which is kept bearing against a fixed stop by means of a spring. These provisions also have the prerequisites that assure dependable engagement of the armature with the electromagnet.

A still further object of this invention is to provide, within the range of motion of the actuating lever, a contact switch which serves to connect to the electronic timing circuit and which is closed by the actuating lever shortly before the armature engages the electromagnet. Since the contact switch provided for connecting to the electronic timing circuit is closed automatically during the cocking of the shutter, and is similarly opened again at the end of the exposure, unnecessary loading of the power supply is avoided.

Other objects and advantages are set forth in greater detail in the following specification taken in conjunction with accompanying drawings in which:

FIGURE 1 is a top view of a self-cocking shutter in the starting position, and shown in conjunction with the diagram of an electronic timing circuit having its front plate removed.

FIGURE 2 shows the shutter in an intermediate position during the executing motion and when the shutter blades occupy the open position.

In accordance with FIGURES 1 and 2, the housing 1 of a photographic self-cocking shutter has a cylindrical side wall 1a and a bottom 1b. The bottom 1b is provided with a tubular socket 1c which is located concentrically with the side wall 1a. A ring 3 serving as the mechanical drive for a plurality of shutter blades 2, is rotatably guided by socket 1c. The shutter blades 2 are pivoted on the driving ring 3 by means of pins 5, and they include slots 2a, each of which is engaged by a pin 6. The pin 6 may be fastened to a ring (not shown in the drawing), which may also be rotatably guided by the tubular socket 1c.

A driving device may be employed in the commonly known manner, to impart a reciprocating motion to the ring 3 for the purpose of opening and closing the shutter blades 2. A one-armed driving lever 7 may be provided, for this purpose, which is acted on by a driving spring 8 and engages a fixed pin 9 when the shutter is in the closed position. Articulately connected to the free end of the driving lever 7, is a sliding pawl 10 which cooperates, by means of its coupling jaw 10a, with the bent-up lug 11a of an intermediate lever 11. This intermediate lever may, in turn, be in engagement with the driving ring 3 by means of a pin/slot connection 12 and 3a respectively. During the period of the exposure, the sliding pawl 10 can be kept in engagement with the lug 11a of the intermediate lever 11, by means of a comparatively weak coil spring 13.

In order to cock the driving spring 8 of the shutter, it is best to provide a driving pawl 14 which cooperates with the driving lever and which bears against a fixed pin 16 due to the action of spring 15. At one end, the driving pawl is articulately connected to an arm 17a of a cocking and release member 17 designed in the form of a shift lever. At the other end the pawl engages a lug 7a of the driving lever, during the cocking process. The cocking and release member 17 is positioned on a pin 18, and is kept in engagement due to the action of a tension spring 19 with a release push rod 20 which serves to actuate the shutter. Instead of the release push rod 20, a lever arm guided laterally out of the shutter housing 1, may be provided on the shift lever 17.

The driving ring 3 includes a recess 3b designed to limit the rotary motion. A fixed stop 21 engages the recessed surface. A coil spring 22 acting on the driving ring 3, is provided for the purpose of keeping the ring in the starting position, during the cocking of the driving device.

In order to make it possible to take photographs with exposure times of different duration, a device is associated with the mechanical shutter blade drive to block the executing motion of the driving device in the open position of the shutter blades 2. This device is controlled by means of an electronic timing circuit. In order to connect the mechanism designed for the drive of the shutter blades, to the electronic timing circuit, it is desirable to provide a two-armed actuating lever 23 mounted on a fixed bearing pin 24. One arm 23a of the actuating lever 23 cooperates with a driving arm 17b provided on the shift lever 17. The arm 17b has, at its free end, a bent-up lug 17c. The lug 17c has an inclined upper edge for the purpose of enabling the free end of the shift lever 17 to return to the starting position, even when the actuating lever already occupies the normal position.

The arm 23b of the actuating lever 23 carries an articulately connected armature 25 whose motion is limited by the pins 26 and 27. The actuating lever 23 is kept bearing against fixed pin 29 through restoring spring 28. The armature 25 cooperates with an electromagnet 30 whose holding duration is determined by the aforementioned electronic timing circuit. The electromagnet 30 may be located on a supporting plate 31 pivoted about the same axis corresponding to actuating lever 23. Plate 31 is kept bearing against fixed pin 33 by means of spring 32.

Associated with the actuating lever 23, is an arresting lever 34 which blocks the executing motion of the mechanical driving device in the open position of shutter blades 2. The arresting lever 34 is kept bearing against a driving lug 23c of the actuating lever 23, by means of spring 35. The arresting lever is mounted co-axially with actuating lever 23. A stopping edge 3c provided on the driving ring 3, serves to block the driving ring in the intermediate position corresponding to the open position of the shutter blades. The arresting lever may, thereby, move in a blocking manner in front of the edge 3c.

In order to provide the electromagnet 30 with current, a contact switch 36 is provided within the range of motion of the actuating lever 23. The position of this contact switch with respect to lever 23 is selected so that the switch is actuated shortly before the armature 25 engages electromagnet 30. Another switch 37 may also be associated with electronic timing circuit. This switch may, for example, be actuated by means of a cam 3d arranged on the driving ring 3, so that the switch is closed in the starting position of the shutter, and opened again at the start of the executing motion.

The aforementioned electronic timing circuit for the purpose of controlling electromagnet 30, is provided in the form of a monostable multivibrator circuit. The circuit is essentially a time-delay device consisting of a resistor and a capacitor. The electromagnet 30 as well as a transistor T1 are connected in series with the contact switch 36 and with a power supply 38. Another circuit which can also be connected to supply 38 by switch 36, includes a capacitor C connected to a seond transistor T2, as well as an adjustable resistor R. The resistor R and the capacitor C form the time-delay device. Other resistors not referenced in the wiring diagram serve to complete the circuit.

The shutter arrangement which includes an electronic timing circuit and is described above, operates in the following manner:

Upon actuation of the push rod 20, the shift lever 17 is rotated clockwise and out of the starting position shown in FIGURE 1. The driving pawl 14 is thereby moved to the left with respect to FIGURE 1, and the actuating lever 23 is simultaneously rotated in a counterclockwise direction. As the release process continues, switch 36 becomes closed by actuating lever 23. Current now flows from power supply or battery 38, through the transistor T1, and to the electromagnet 30. Transistor T2 is, in the meantime, blocked.

As the motion of the release push rod 20 continues, armature 25 located on actuating lever 23, finally engages and becomes held by electromagnet 30. The armature continues to be held for as long as electromagnet 30 is supplied with current. While actuating lever 23 changes from its normal position to the position illustrated in FIGURE 2, the arresting lever 34 connected to lever 23, becomes placed on the driving ring 3 due to the action of spring 35.

With the movement of driving pawl 14, driving lever 7 is pivoted clockwise by the free end of the pawl which engages lug 7a of lever 7. Driving spring 9 is, with this, cocked simultaneously. The sliding pawl 10 also participates in this motion, but without moving the intermediate lever 11 out of its starting position. This is due to the condition that during the first phase of motion of the driving lever 7, pawl 10 slides ineffectively along the underside of the lug 11a of the intermediate lever 11. The pawl finally engages, by means of the jaw 10a, the lug 11a due to the action of spring 13. At the conclusion of the cocking motion described above, and while contact switch 36 is closed by the actuating lever 23, the free end of driving pawl 14 finally slides off lug 7a of driving lever 7. This is after driving arm 17b of shaft lever 17 had already been removed from engagement with the lever arm 23a.

After retraction of the driving pawl 14, the spring-loaded driving lever 7 becomes operative and imparts a reciprocating-rotary motion to the driving ring by means of intermediate lever 11 and sliding pawl 10. The shutter blades are thereby conveyed into the open position. When driving ring 3 has reached the intermediate position corresponding to the open position of the shutter blades, lever 34 becomes placed in front of edge 3c, and thereby blocks the further executing motion of the driving device (FIGURE 2).

Since driving ring 3 had opened switch 37 upon leaving its normal position, capacitor C has been charging since that moment. When the charging process is completed, transistor T2 associated with the capacitor becomes conductive. Due to the feedback coupling of the two transistors T1 and T2, the current in transistor T2 increases rapidly at this moment, while transistor T1 becomes cut off. As a result, the flow of current to the electromagnet 30 becomes interrupted, the magnetic field collapses, and the armature 25 is released again by the electromagnet. Due to the action of restoring spring 28, lever 23 now returns to its starting position, and thereby removes arresting lever 34 from contact with the driving ring 3. This conveys instantly the shutter blades into the closing position again. The return motion of actuating lever 23 to the starting position, causes the contact switch 36 to open automatically, while contact switch 37 becomes closed when driving ring 3 transfers to the closing position.

While this invention has been described in some detail, it will be understood by those skilled in the art that variations and modfications may be made without departing from the spirit thereof or the scope of the following claims.

What is claimed is:

1. A photographic self-cocking shutter comprising: shutter blades reciprocable by a driving device; a driving member cooperating with an escapement device for obtaining different exposure times in open position; a two-armed actuating lever; a restoring spring acting on said actuating lever, said actuating lever participating in the motion of the cocking and release member during the cocking process of said shutter; an electromagnet; an armature carried at one end of said actuating lever and cooperating with said electromagnet; an electronic timing circuit controlling said electromagnet; an arresting lever associated with said actuating lever, said arresting lever being movable with said actuating lever and coming into engagement with said driving member of said shutter blades when said shutter blades are in open position, and being guided out of the arresting lever's locking position by said actuating lever when said actuating lever returns to its initial position.

2. The photographic shutter of claim 1, wherein said arresting lever is mounted coaxially with said actuating lever, and is coupled to said actuating lever.

3. The shutter of claim 2, wherein said cocking and release member adapted to actuate said shutter includes a driving arm acting upon said actuating lever and being automatically moved out of engagement during said cocking process of said shutter, following engagement of said armature by said electromagnet.

4. The photographic shutter of claim 3, wherein said electromagnet is fastened to a supporting plate pivoted coaxially with said actuating lever and being held against a fixed stop by means of a spring.

5. The photographic shutter of claim 4, wherein a contact switch arranged within the range of motion of said actuating lever, connects to said electronic timing circuit, said contact switch being closed by said actuating lever shortly before said armature engages said electromagnet.

6. A photographic self-cocking shutter comprising: shutter blades reciprocated by a driving device; a driving member being associated, for obtaining different exposure times, with an escapement device, in open position; an electromagnet mounted on a supporting plate; an armature cooperating with said electromagnet controlled by an electronic timing circuit; a contact switch connecting to said electronic timing circuit; an actuating lever acted upon by a spring and being engaged during the cocking process of said shutter, in the motion of the cocking and release member, said actuating lever carrying said armature, being coaxially mounted with said supporting plate, and closing said contact switch before said armature contacts said electromagnet; an arresting lever coupled to said actuating lever, being movable with said actuating lever, and coming into engagement with said driving member of said shutter blades when said shutter blades are in open position, said arresting lever being moved out of its arresting position by said actuating lever when said actuating lever returns to its normal position; and a driving arm associated with said cocking and release member and being acted upon by said actuating lever, said driving arm being moved out of engagement following engagement of said armature with said electromagnet.

7. A photographic self-cocking shutter comprising: a driving device for reciprocating the shutter blades of said shutter; an escapement device with driving member for obtaining different exposure times, in open position; an actuating lever and an arresting lever associated with said actuating lever, said arresting lever being coupled to said actuating lever and engaging said driving member of said shutter blades when said shutter blades are in open position, and being guided out of the locking position by said actuating lever when said actuating lever returns to its initial position; a contact switch actuated within the range of motion of said actuating lever; an electronic timing circuit connecting to said contact switch; an electromagnet situated on a supporting plate pivoted coaxially with said actuating lever, said plate being held against a fixed stop by means of a spring, said electromagnet being under control of said timing circuit; an armature cooperating with said electromagnet and being associated with said actuating lever; a spring acting on said actuating lever, said actuating lever participating in the motion of the cocking and release member; and a driving arm acting upon said actuating lever and becoming disengaged during the cocking process of said shutter, following engagement of said armature by said electromagnet.

8. A photographic self-cocking shutter comprising: a driving device to reciprocate the shutter blades of said shutter, and a driving member associated with an escapement device for obtaining different exposure times in open position; a contact switch and an electronic timing circuit, said contact switch connecting to said timing circuit; an actuating lever associated with said contact switch and actuating said contact switch, said actuating lever being associated with an arresting lever; an electromagnet carried by a supporting plate mounted on the axis of said actuating lever, said electromagnet being controlled by said timing circuit; an armature supported by said actuating lever and associated with said electromagnet, said contact switch being closed before said armature engages said electromagnet; a spring acting on said actuating lever, said actuating lever participating in the motion of the cocking and release member, and being coupled to said arresting lever, said arresting lever engaging said driving member of said shutter blades when said shutter blades are in open position, and being moved out of its arresting position by said actuating lever when said actuating lever returns to its normal position; and a driving arm acted upon by said actuating lever and being associated with the cocking and release member, said driving arm becoming disengaged following engagement of said armature with said electromagnet.

References Cited
UNITED STATES PATENTS 3,165,989    1/1965    Kiper _____ 95—10

JOHN M. HORAN, *Primary Examiner.*